Feb. 8, 1927.
P. J. LEONARD
1,617,064
DISH DRAINER
Filed Dec. 5, 1923    2 Sheets-Sheet 1
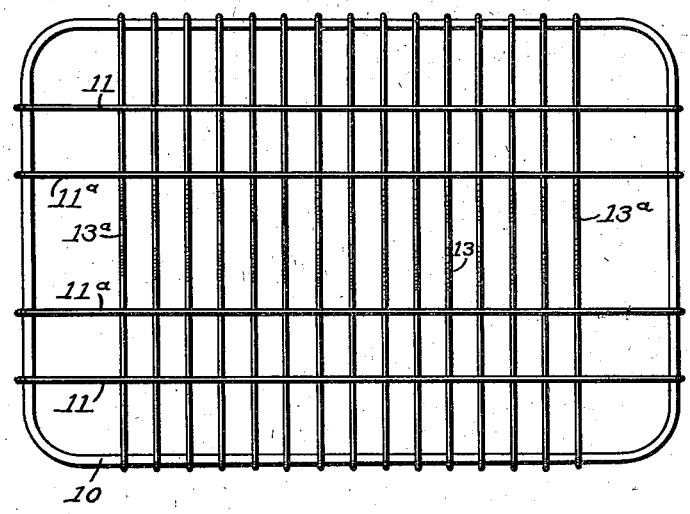
Fig. 1
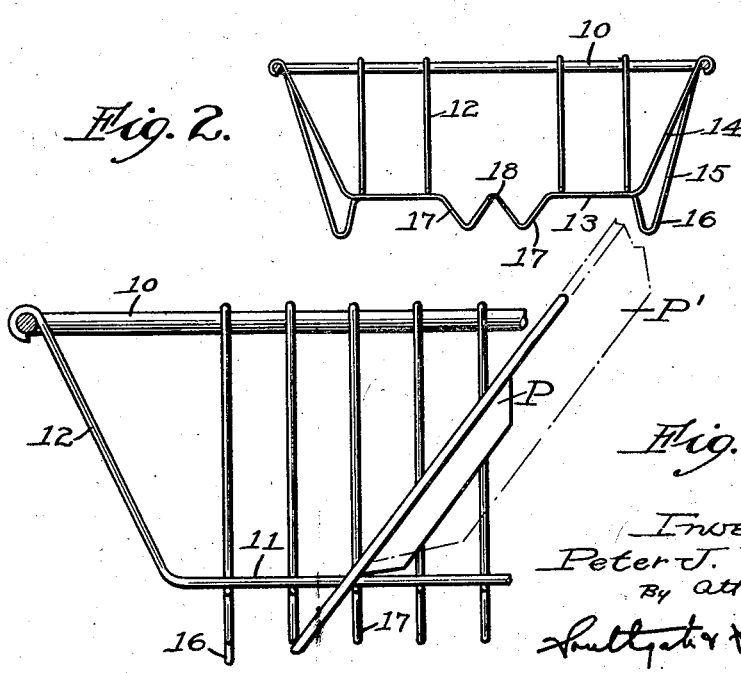
Fig. 2.
Fig. 3.
Inventor
Peter J. Leonard
By Attorneys,
Southgate & Southgate Feb. 8, 1927.
P. J. LEONARD
DISH DRAINER
Filed Dec. 5, 1923
1,617,064
2 Sheets-Sheet 2

Inventor
Peter J. Leonard
By Attorneys
Southgate & Southgate

Patented Feb. 8, 1927.

1,617,064

UNITED STATES PATENT OFFICE.

PETER J. LEONARD, OF WORCESTER, MASSACHUSETTS, ASSIGNOR, BY MESNE ASSIGNMENTS, TO THE CHASE NATIONAL BANK OF THE CITY OF NEW YORK, TRUSTEE, OF NEW YORK, N. Y.

DISH DRAINER.

Application filed December 5, 1923. Serial No. 678,766.

This invention relates to a dish drainer, preferably of woven or welded wire construction, and is particularly directed to the provision of an improved dish rack in the bottom of such a drainer.

One object of my invention is to provide a dish rack which will support dishes of varying sizes at substantially the same angle to the bottom of the dish drainer.

Another object is to provide a dish drainer with a dish rack entirely disposed below the level of the inside of the bottom of the drainer, thereby leaving the bottom entirely unobstructed for any other desired purpose.

I have also provided a novel application of my invention to a circular dish drainer in which each of the two sets of bottom members provides dish racks for the other set of members.

My invention further relates to arrangements and combinations of parts which will be hereinafter described and more particularly pointed out in the appended claims.

Two forms of the invention are shown in the drawing in which

Fig. 1 is a plan view of a substantially rectangular dish drainer embodying my invention;

Fig. 2 is a sectional transverse elevation thereof;

Fig. 3 is a partial longitudinal sectional elevation thereof;

Figure 4:
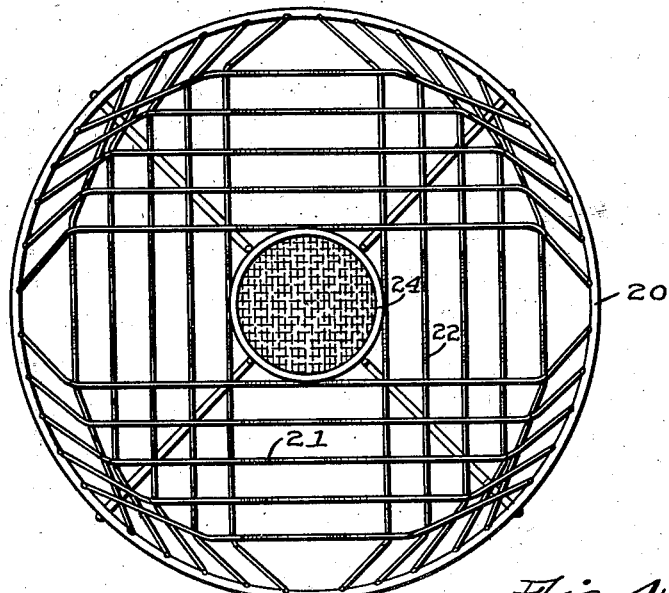
Fig. 4 is a plan view of a circular type of dish drainer.

Referring to Figs. 1 to 3, I have shown a substantially rectangular dish drainer comprising a frame 10 extending around the upper edge of the dish drainer, a plurality of longitudinal bottom members 11 having their end portions 12 extending upward and secured to the frame 10. I have also shown a second set of bottom members 13 extending crosswise of the members 11 and also having their end portions 14 projected upwardly and secured to the frame 10. Selected cross members 13ª may have their end portions 15 reversely bent downward to provide legs or supports 16 for the corners of the drainer.

It will be noted that the cross wires 13 are relatively close together and that the longitudinal wires 11 are spaced apart, with the middle pair of longitudinal wires 11ª spaced at a substantially greater distance apart. Between these middle wires 11ª the cross wires 13 are bent downward to form a depressed portion 17 having a central raised portion 18. The general outline of this depressed portion is that of the letter W and in the preferred form no portion of the intermediate portion 17 or the raised portion 18 extends above the plane of the bottom wires 11 and 13.

The effectiveness of the depressed portion 17 and raised portions 18 to form a dish rack for plates and other articles resting on the bottom of the drainer is clearly illustrated in Fig. 3, in which a small plate P is shown in full lines and a larger plate P' is shown in broken lines. It will be evident that both of these plates are engaged by the substantially flat outer edge portion of the plate and that they will be held at approximately the same angle, regardless of the fact that the edge flange in different plates is of varying width and that the plates also are of different depths.

Attention is again called to the fact that no part of the dish rack projects above the plane of the bottom of the drainer, so that the entire inner surface of the drainer is available for receiving cups, tumblers, pitchers and other articles which cannot be placed between the bottom wires 13.

Figure 5:
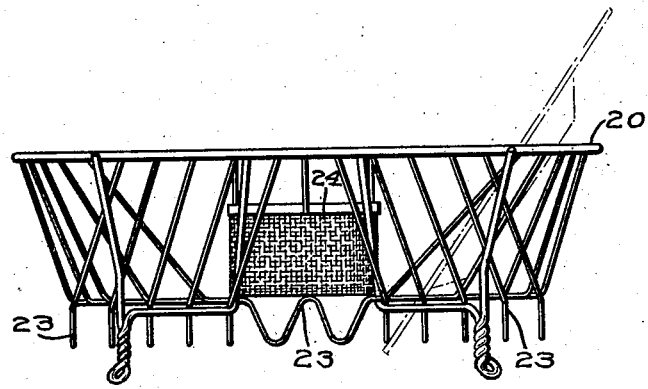
Fig. 5 is a side elevation thereof.

In Figs. 4 and 5 I have shown my invention as applied to a circular type of dish drainer, having a frame 20 to which are secured two sets of bottom members 21 and 22. These members extend substantially at right angles to each other and the end portions of each member are projected upward and secured to the frame or rim 20 of the drainer. The middle pair of bottom members in each set are spaced apart, as in the form previously described, and the intermediate portion of each bottom member is depressed and again bent upward to form a dish rack 23 as indicated in Fig. 5. A wire receptacle 24 may be placed at the center of the dish drainer if desired to receive silverware or other articles.

In this construction, it will be seen that each set of bottom members provides dish racks for the other set of bottom members and in this form also the entire inner surface of the drainer is unobstructed by the dish racks.

Having thus described my invention and the advantages thereof, I do not wish to be limited to the details herein disclosed otherwise than as set forth in the claims, but what I claim is:—

1. A dish drainer comprising a frame, dish supporting bottom wires extending in one direction and secured to said frame, said wires being widely separated to permit the edge of a plate supported thereby to project substantially below the plane of said wires, and additional bottom wires extending crosswise of said first bottom wires and secured thereto, adjacent wires of said additional wires having depressed portions between said spaced bottom wires and each depressed portion being upwardly bent at one intermediate point of its depressed portion to form a stop for engagement by the lower edge of the plate between said adjacent supporting wires.

2. A dish drainer comprising a frame, dish-supporting bottom wires extending in one direction and secured to said frame, said wires being widely separated to permit the edge of a plate supported thereby to project substantially below the plane of said wires, and additional bottom wires extending crosswise of said first bottom wires and secured thereto, adjacent wires of said additional wires having depressed portions between said spaced bottom wires and each depressed portion being upwardly bent at an intermediate point of its depressed portion to form a stop for engagement by the lower edge of the plate between said adjacent supporting wires, said stop being substantially in the shape of a W with the upper central point thereof approximately in the plane of said supporting wires.

3. A circular wire dish drainer comprising a frame, a set of parallel bottom members with the middle pair thereof spaced apart at a substantial distance, and a second set of parallel bottom members disposed substantially at right angles to said first bottom members, with the middle pair of said second set also spaced at a substantial distance, the bottom members of each set having intermediate portions depressed below the plane of the bottom and between the spaced members of the other set and a part of each depressed portion being upwardly bent to form a rack for dishes in said drainer.

4. A wire dish drainer comprising a frame, a set of parallel bottom members, and a second set of parallel bottom members disposed substantially at right angles to said first bottom members, the bottom members of each set having intermediate portions depressed below the plane of the bottom and between the spaced members of the other set, and a part of each depressed portion being upwardly bent to form a rack for dishes in said drainer.

5. A dish drainer having a frame and two sets of bottom members positioned crosswise of each other and firmly secured to each other, each set of bottom members having portions bent out of the plane thereof to provide a rack for dishes supported by the other set of bottom members.

In testimony whereof I have hereunto affixed my signature.

PETER J. LEONARD.